July 20, 1954

A. G. GROSS 2,684,427

TOASTER TIMER

Filed Oct. 19, 1949

INVENTOR.
Alfred G. Gross
BY
Harry S. [Neuasse]
ATTORNEY.

July 20, 1954        A. G. GROSS        2,684,427

TOASTER TIMER

Filed Oct. 19, 1949        3 Sheets-Sheet 2

INVENTOR.
Alfred G. Gross
BY
Harry S. [illegible]
ATTORNEY.

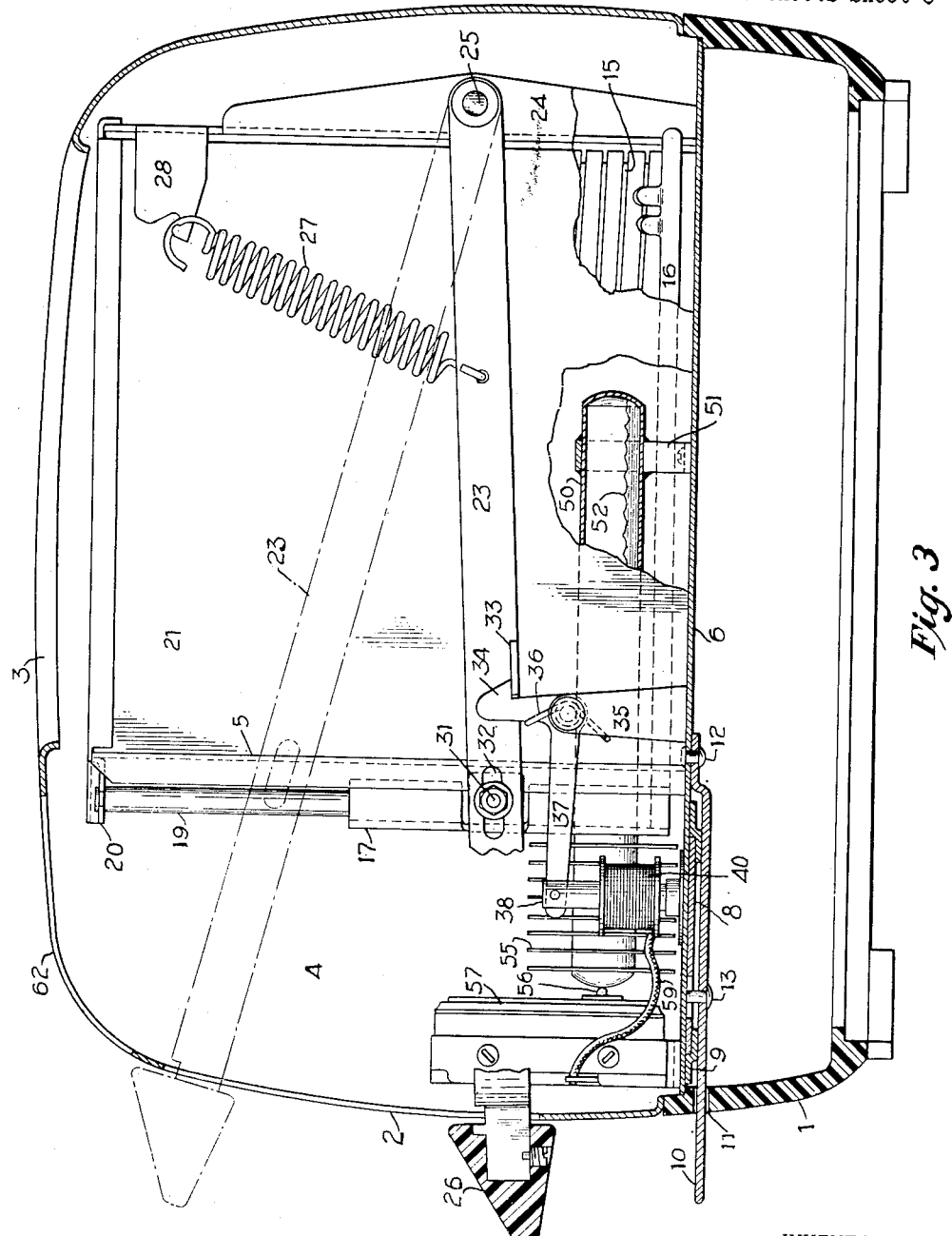

Patented July 20, 1954

2,684,427

UNITED STATES PATENT OFFICE 2,684,427

TOASTER TIMER

Alfred G. Gross, Wilmette, Ill., assignor to The Hoover Company, North Canton, Ohio, a corporation of Ohio Application October 19, 1949, Serial No. 122,242

4 Claims. (Cl. 219—19)

My present invention relates to the art of cooking devices and in particular to a novel timing mechanism specially designed to govern the operation of electric bread toasting devices.

It is a particular object of my invention to provide a toaster timing mechanism which inherently shortens the toasting period of operation as the oven temperature progressively increases during closely succeeding toasting operations without the use of auxiliary compensating devices.

It is a further object of my invention to provide a toaster timing mechanism characterized by the provision of a thermostatic means so arranged that it is continuously subjected to a major cooling effect which causes the rate of heat increase of the thermostatic mechanism per unit of time to decrease progressively as the thermostatic means approaches its operating temperature.

It is a further object of my invention to provide a thermostatic device in a toaster timer so constructed and arranged that its heating and cooling rate are approaching an equilibrium condition as it reaches operating temperature whereby its heat slowly as it approaches its operating temperature and cools with great rapidity immediately the toaster heating means are de-energized.

In particular, I provide a timing mechanism including a heated thermostatic element having a vaporization-condensation heat transfer system so arranged that the heat rejecting portion of the heat transfer system is shielded from the direct influence of the means utilized to heat the thermostatic element and is provided with a very extensive heat dissipating area which is always operative to cool the heated thermostatic element as long as its temperature exceeds the ambient. The heating means, the thermostatic element, and the heat dissipating systems are so proportioned relative to each other that the rate of heat dissipation is approaching the rate of heat absorption by the thermostat as it approaches a predetermined operating temperature whereby the timing mechanism automatically shortens closely succeeding toasting operations for increasing oven temperatures; the thermostat operates through a narrow temperature range if toasting operations closely succeed each other, and the thermal mechanism reconditions itself for operation with great rapidity after each toasting operation.

Other and more particularly objects of the invention will become apparent as the description proceeds when taken in connection with the specification and accompanying drawings wherein:

Figure 3 is a partial side sectional elevational view of the apparatus of Figures 1 and 2.

Figure 1:
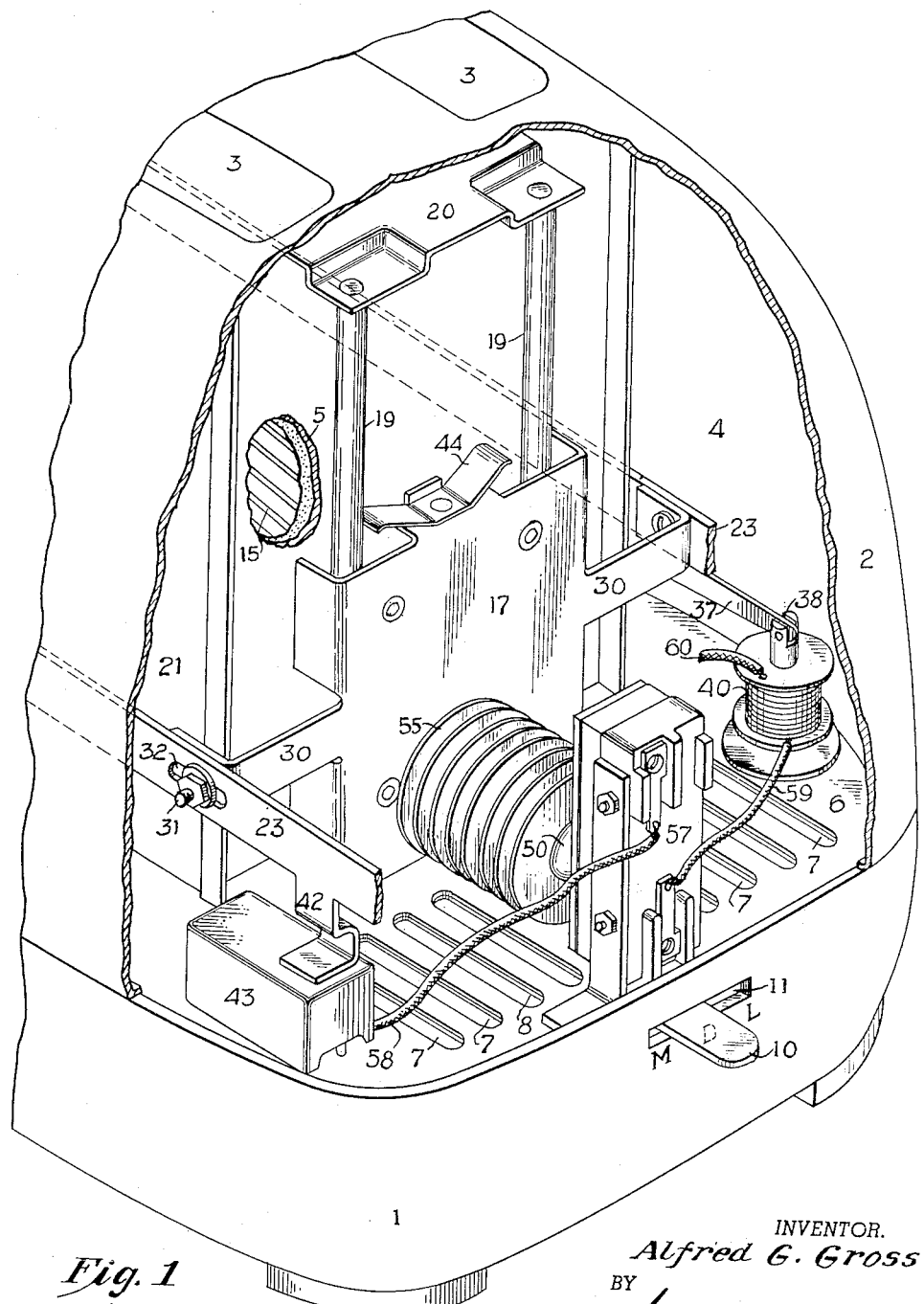
Figure 1 is a partial sectional elevational view of an electrically operated toaster timer embodying my invention.

Referring now to the drawings the toasting apparatus comprises a base section 1 preferably constructed of electrical and heat insulating material. A shell 2 housing toasting ovens 3 and a control chamber 4 separated from the toasting chamber by an insulated partition wall 5 is mounted on the base section 1. A base plate 6 forms a common base for the toasting ovens 3 and the control chamber 4. That portion of the plate 6 forming the base of the control chamber 4 is provided with a plurality of large air inlet slots 7. A similarly slotted plate 8 is slideably mounted in guide channels 9 under the slotted portion of the plate 6 in order to control the air flow through the opening 7. The plate 8 is actuated by a lever 10 extending through a slot 11 in the end wall of the base 1 of the toaster housing. The arm 10 is pivotally mounted on a pin 12 secured to the base 6 and is connected to the slide plate 8 by a pin 13.

The two toasting ovens 3 are each heated in a conventional manner by a sheet-like electrical heating element 15 arranged on opposite sides of the ovens. Each oven is provided with a conventional support carriage 16 lying in the center thereof and provided with a forwardly projecting portion extending through slots in the insulated wall 5 to join rigidly to the rear wall of a carriage support slide 17. The foregoing arrangement of toaster oven heating elements and toast supporting carriages passing through slots in an end wall of the oven is conventional and not shown in detail. It is within the scope of the present invention to use other known types and arrangements of ovens and toast supports.

The toast carriage support slide 17 is provided on its rear face with a plurality of rollers 18 which engage vertical guide posts 19 extending between the base plate 6 and an upper support plate 20 secured to the upper portion of the partition 5.

The outer side walls of the toasting oven are defined by partition plates 21 spaced from the corresponding side walls of the outer shell 2 to provide free spaces in which are mounted the carriage slide actuating arms 23. The arms 23 are pivoted at 25 to vertical support struts 24 in the end of the toasting structure opposite to the control chamber 4. The arms 23 curve around the front end of the control chamber in a conventional manner, join and pass through a slot in the end wall of the shell 2. The projecting common end of the arms 23 carries an actuating handle 26 by means of which the arms 23 may be depressed. A tension spring 27 connected between one of the arms 23 and a lug 28 carried on an extension on the strut 24 constantly urges the arms 23 into upper, non-toasting position, shown in dotted lines in Figure 3.

The carriage support slide 17 carries laterally projecting arms 30 provided with pins 31 engaging in slots 32 formed in the arms 23 whereby the tension spring 27 raises the slide 17 and its associated toast support racks 16 into upper, toast ejecting and non-toasting position. The toast support mechanism and carriage arms 23 are maintained in the lower toasting position, illustrated in Figure 3, by a latch 34 which engages over a lug 33 carried by one of the arms 23. The latch 34 is pivotally mounted upon a supporting standard 35 and is urged into the latching position shown by the torsion spring 36. The latch 34 is provided with a forwardly extending actuating arm 37 pivotally connected to the armature 38 of a control solenoid 40 which is fixedly supported upon the base plate 6 of the toaster assembly.

Figure 2:
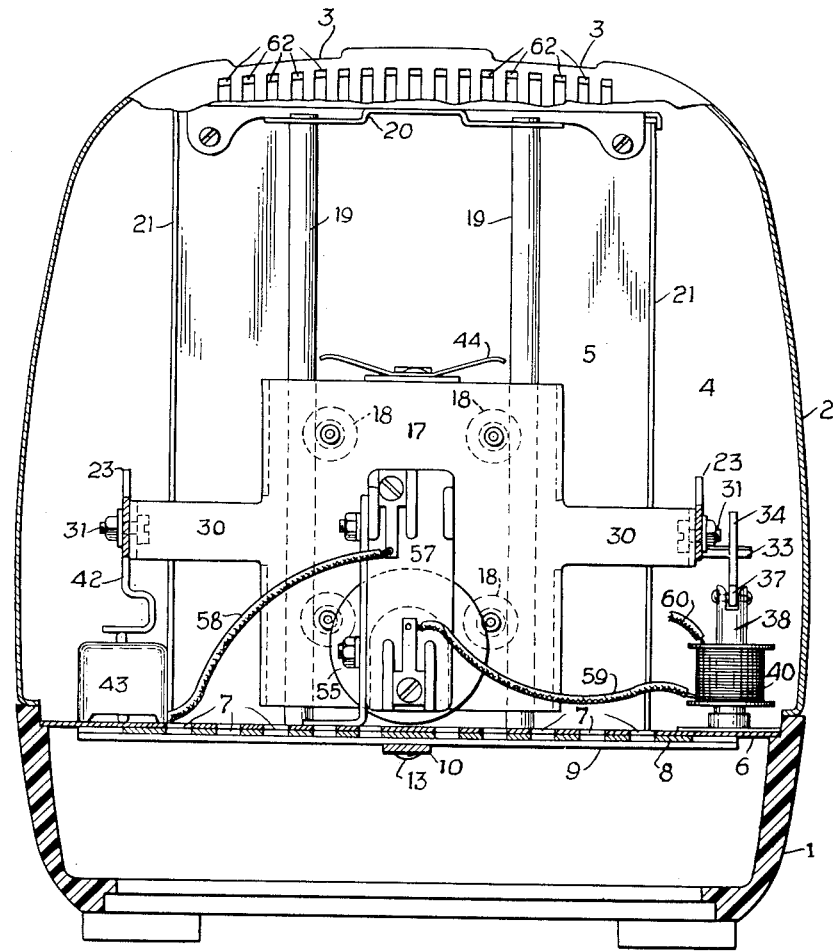
Figure 2 is an end elevational sectional view through the timing mechanism chamber of the apparatus of Figure 1.

The arm 23 opposite to the one carrying the latching lug 33 carries a downwardly projecting foot member 42 adapted to actuate a line switch 43 to energize the toasting mechanism when the carriage support mechanism is held in the lower toasting position illustrated in Figures 2 and 3. The switch 43 is of the normally open circuit type whereby it automatically deenergizes the toasting mechanism when the latch 34 releases the carriage mechanism and allows the spring 27 to raise the same to the upper, non-toasting position.

A leaf spring 44 is mounted upon the upper edge of the carriage slide 17 in position to engage the under surface of the supporting plate 20 in order to cushion the upward movement of the toasting carriages under the bias of the spring 27.

The duration of the toasting operation is controlled primarily by a thermal element indicated generally at 50. This element may have various forms, the illustrated embodiment is in the form of an elongated tube extending into the space between the toasting ovens adjacent the bottom plate 6 of the toaster assembly. The inner end of the tube 50 is rigidly mounted upon a bracket 51 secured to the base plate 6. The tube 50 passes through a suitable opening in the insulated partition wall 5 with a loose fit to permit the end thereof terminating in the chamber 4 to move longitudinally of the toaster as its temperature varies. The carriage slide 17 is suitably slotted to pass over the tube 50 in toasting position. The hollow tube 50 is hermetically sealed and is charged with a volatile liquid 52 to approximately the level indicated in the sectional view of Figure 3. Any suitable volatile liquid such as water or methyl chloride, for example, may be utilized. The free end of the tube 50 which projects into the chamber 4 is slightly higher than the fixed end thereof to insure return of condensed cooling medium to the heated end thereof and is provided with a plurality of large area heat dissipating fins 55. The free end of the tube 50 is positioned to engage the actuating element 56 of an electrical switch 57 of the type requiring movement of only a few thousandths of an inch to operate the switch element. The switch 57 is of the normally open circuit type.

The wiring between the main control switch 43 and heating element is not illustrated as it is conventional. The switch 57 is connected to the switch 43 by a wire 58 to be energized when switch 43 is closed. The other terminal of switch 57 connects to the solenoid 40 by a wire 59. The other side of the solenoid 40 is connected by means of a wire 60 to the supply line which is not interrupted by the switch 43.

In the operation of the device, heat applied to that portion of the tube 50 within the toasting oven structure raises its temperature until it expands sufficiently to engage and actuate the button 56 which energizes the solenoid 40. When energized the solenoid 40 attracts the armature 38 which rocks the latch 34 counterclockwise, as viewed in Figure 3, to release the toast carriage. Immediately the toast carriage is released it is raised under the bias of the spring 27 which allows the switch 43 to open and deenergize the entire mechanism after which the latch 34 returns to the latched position under the bias of the spring 36.

Figure 4:
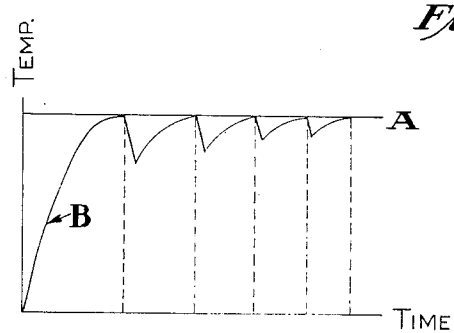
Figure 4 is a graph illustrating the variations in thermal condition of the thermostat when toasting operations closely succeed each other.

Referring now to Figure 4 there is illustrated a typical time temperature diagram showing the temperature at which the thermostatic element 50 will operate the switch 57 to terminate a toasting period of operation and the duration of closely succeeding toasting operations. The thermostatic element must be heated until its average temperature is that represented by the horizontal line A. The curve B shows the temperature variation of the thermostatic element per se during closely succeeding toasting operations. The distances measured along the coordinate of time between the dotted vertical lines measures the intervals between termination of succeeding toasting periods. The actual length of the toasting operation is the distance parallel to the coordinate of time during which the curve B is rising and the intervals between succeeding toasting operations are represented by the time coordinates of those portions of the curve B which are falling. Assuming that the toaster and all parts thereof are at room temperature, the following sequence of events will occur as it is put into use. Immediately the handle 26 is lowered to latched position and the heating elements 15 are energized heat is simultaneously applied to the thermostat tube 50. Since the temperature of the thermostat 50 is at this time low, it heats rapidly as shown by the initial portion of the curve B. As the temperature of the thermostat gradually rises above the temperature of the air in the room, its rate of heat loss also increases. The heat applied to the thermostat is transferred by conduction and also by the vaporization of the fluid therein in the heated part and condensation of such fluid in the cool part of the thermostat to heat the fins 55 which then reject the heat to cooling air flowing through the slots 7 over the fins and out through the slots 62 in the upper wall of the chamber 4. The rate of rejection of heat applied to the thermostat increases as its temperature rises, that is, its heating rate tends to slow down until it approaches equilibrium with the heat output at the temperature at which the switch 57 is actuated. At the termination of an initial toasting operation the oven is hot so its temperature begins to drop immediately the heaters 15 are deenergized. However, the chamber 4 is comparatively cool and a considerable draft of air is flowing therethrough dissipating the heat from the thermostatic mechanism. Since the apparatus is designed and proportioned to approach an equilibrium condition between heat input and output at the temperatures at which the switch 57 is actuated, the temperature decrease of the thermostat 50 is very rapid immediately the heaters 15 are deenergized thus quickly conditioning the apparatus for succeeding toasting operations. On the next toasting operation the thermostat begins to time the operation at an elevated temperature, however, this is desirable as the oven is now hot and the succeeding toasting operation must be of shorter duration than the initial one. The greater heat input to the thermostat after the initial toasting operation tends to shorten the toasting period but this is part offset by the high heat dissipation rate from the fins 55 to the cooling air flowing through the chamber 4. The total elapsed time of the second toasting operation is therefore shorter than that which occurred during the initial toasting operation. The duration of succeeding toasting operations is similarly shortened for several periods until the toasting oven reaches an equilibrium condition after which the duration of toasting operations is constant as long as they succeed each other closely in time.

Though the illustrated embodiment of the invention utilizes the main oven heating means to heat the thermostat the invention may be practiced by placing the heated portion of the thermostat in a separate compartment which is heated by an auxiliary heating element.

The preferred, illustrated, form of the thermostatic mechanism is a simple unitary structure however, the heated thermostat and the cooling system may be separate entities with the thermostat in heat transfer relation with the heat absorbing part of the cooling system.

The present invention therefore provides a construction characterized by the provision of a thermostat which is at all times subjected to a major cooling effect of a magnitude such that the heat input and loss rates approach equilibrium as the thermal element approaches the temperature at which it operates the control mechanism. The foregoing condition insures extremely rapid cooling of the thermal element at the termination of a toasting operation so as to recondition the same for a succeeding toasting operation. Due to the slow increase in temperature of the thermostat 50 as it approaches operating conditions, its temperature variation after the first toasting operation is small, but the high rate of heat rejection occurring throughout its operating period and in the intervals between toasting operations results in a slow temperature rise during toasting operations and a precipitate temperature drop therebetween.

The relative heat absorbing and heat rejecting rates of the various parts of the thermostat must be properly proportioned for each design of toaster structure. For example, after the oven structure and its heating means are designed, the thermostat and its cooling structure are designed to suit the particular oven. To accomplish the foregoing the thermostat may be designed to operate at some particular temperature to which it may readily be heated by the oven, the cooling system is then designed to apply the necessary thermal drag on the particular thermostat to allow it to reach the set temperature at the proper time.

While I have illustrated and described the invention in considerable detail, it is to be understood that various changes may be made in the arrangement, proportion and construction of parts without departing from the spirit of the invention or the scope of the appended claims.

I claim:

1. Toasting apparatus comprising an oven, means for heating said oven, a control chamber, means providing for flow of cooling air through said chamber, an elongated tubular element charged with a volatile liquid positioned to extend into said oven and into said chamber, a plurality of heat dissipating fins in said chamber thermally bonded to said tubular element, means for energizing said heating means to initiate a toasting operation, means actuated by said tubular element when heated for terminating a toasting operation, and means for regulating the flow of cooling air through said chamber for varying the time required to heat said tubular element to a predetermined temperature.

2. In a toaster, an oven, a control chamber separated from said oven chamber, a thermostat in said oven, means for heating said oven and said thermostat, a heat dissipating means in said control chamber, means for continuously transferring heat from said thermostat to said heat dissipating means whenever a temperature differential exists therebetween whereby the rate of increase in the temperature of said thermostat when heated by said heating means is retarded by heat dissipated from said heat dissipating means during a toasting operation and said thermostat is precipitously cooled immediately after each toasting operation, means for energizing said heating means to initiate a toasting operation, and means actuated by said thermostat when heated to a predetermined temperature for de-energizing said heating means to terminate a toasting operation.

3. In a toaster, an oven, means forming a cooling air duct adjacent said oven, means for heating said oven, means for energizing said heating means to initiate a toasting operation, a thermostatic mechanism for determining the duration of toasting operations including a part positioned to be heated by said oven heating means and a vaporization-condensation system charged with a volatile cooling medium for cooling said part during and between toasting operations having a heat dissipating member in said air duct for receiving vapor generated by cooling said part and for returning condensate to be vaporized by heat absorbed by said part, said vaporization-condensation system being unobstructed at all times to provide free flow of a cooling medium between the part to be heated and the heat dissipating member whenever a temperature differential exists therebetween, means providing an extensive heat dissipating area thermally joined to said heat dissipating member in said air duct, and means operated by said thermostatic mechanism when said part is heated to a predetermined degree for de-energizing said heating means.

4. Toasting apparatus comprising an oven, means for heating said oven, a control chamber, means providing for flow of cooling air through said chamber, an elongated tubular element charged with a volatile liquid positioned to extend into said oven and into said chamber, said tubular element being unobstructed internally to provide free passage of the volatile liquid and vapor thereof longitudinally of the tubular element whenever a temperature difference exists between spaced parts thereof, a plurality of heat dissipating fins in said chamber thermally bonded to said tubular element, means for energizing said heating means to initiate a toasting operation, and means actuated by said tubular element when heated for terminating a toasting operation.

References Cited in the file of this patent

UNITED STATES PATENTS

| Number | Name | Date |
|---|---|---|
| 1,358,073 | Fulton | Nov. 9, 1920 |
| 1,408,744 | Keen et al. | Mar. 7, 1922 |
| 1,540,628 | Hurxthal et al. | June 2, 1925 |
| 1,724,758 | Gay | Aug. 13, 1929 |
| 1,930,836 | D'Amico | Oct. 17, 1933 |
| 2,132,622 | Ireland | Oct. 11, 1938 |
| 2,148,407 | Pierson | Feb. 21, 1939 |
| 2,236,402 | Gomersall | Mar. 25, 1941 |
| 2,339,183 | Myers | Jan. 11, 1944 |
| 2,585,514 | Sutton | Feb. 12, 1952 |

FOREIGN PATENTS

| Number | Country | Date |
|---|---|---|
| 444,736 | Great Britain | Mar. 26, 1936 |